Sept. 3, 1946.　　　　G. F. COLLEY　　　　2,406,996
TIRE REMOVING APPARATUS
Filed Aug. 1, 1944　　　　3 Sheets-Sheet 1
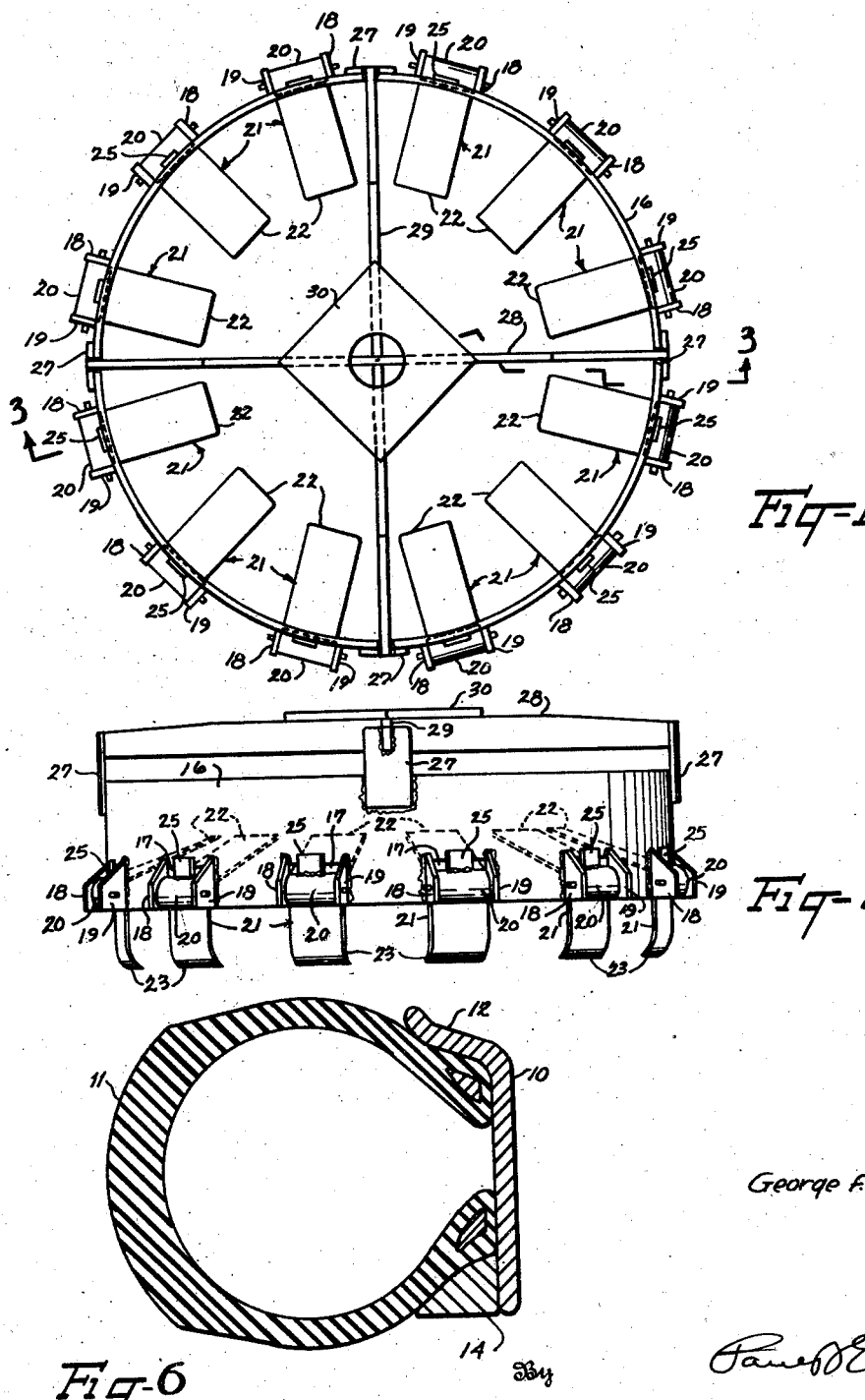
George F. Colley
Inventor Patented Sept. 3, 1946

2,406,996

UNITED STATES PATENT OFFICE 2,406,996

TIRE REMOVING APPARATUS

George F. Colley, Augusta, Ga., assignor to Wade R. Bedingfield, Augusta, Ga.

Application August 1, 1944, Serial No. 547,544

1 Claim. (Cl. 157—6)

This invention relates to a tire tool and more especially to a tire tool adaptable for use on heavy truck tires for forcing the bead of a pneumatic casing away from its associated rim.

In large truck tires, the bead of the pneumatic casing becomes stuck to the flange of the rim and with ordinary tire tools engaging only one place at a time on the rim, it is difficult to remove the tire from the rim; that is, to break the bead of the tire away from the rim as it is in many instances securely stuck to the flange of the rim as a result of rust and corrosion.

It is an object of this invention to provide a tire tool comprising a circular member having a plurality of pivoted dogs thereon adapted to fit down onto the tire casing immediately outside of the flange of the rim and having a transverse bridgework on which a jack is adapted to be supported with a plurality of tong like members adapted to engage the remote side of the rim, so that when the jack is raised, the circular member with the plurality of pivoted fingers thereon will be forced downwardly to force the bead of the casing away from the flange of the rim.

It is another object of this invention to provide a mechanism for removing pneumatic casings from rims comprising a circular member having a plurality of means for engaging a tire adjacent the flange of the rim and having other means for engaging the remote side of the rim with means for forcing the first-named means downwardly and forcing the second-named means upwardly to thereby move the means engaging the tire and the means engaging the rim towards each other to force the bead of the tire away from the flange of the rim to enable its easy removal.

Some of the objects of the invention having been stated, other objects will appear as the description proceeds, when taken in connection with the accompanying drawings, in which:

Figure 1 is a top plan view of the apparatus, omitting the jack and tongs;

Figure 2 is an elevation of the structure shown in Figure 1;

Figure 6 is a cross-sectional view through a casing and rim of the type shown in Figure 3 before the flange 14 is removed.

Figure 3:
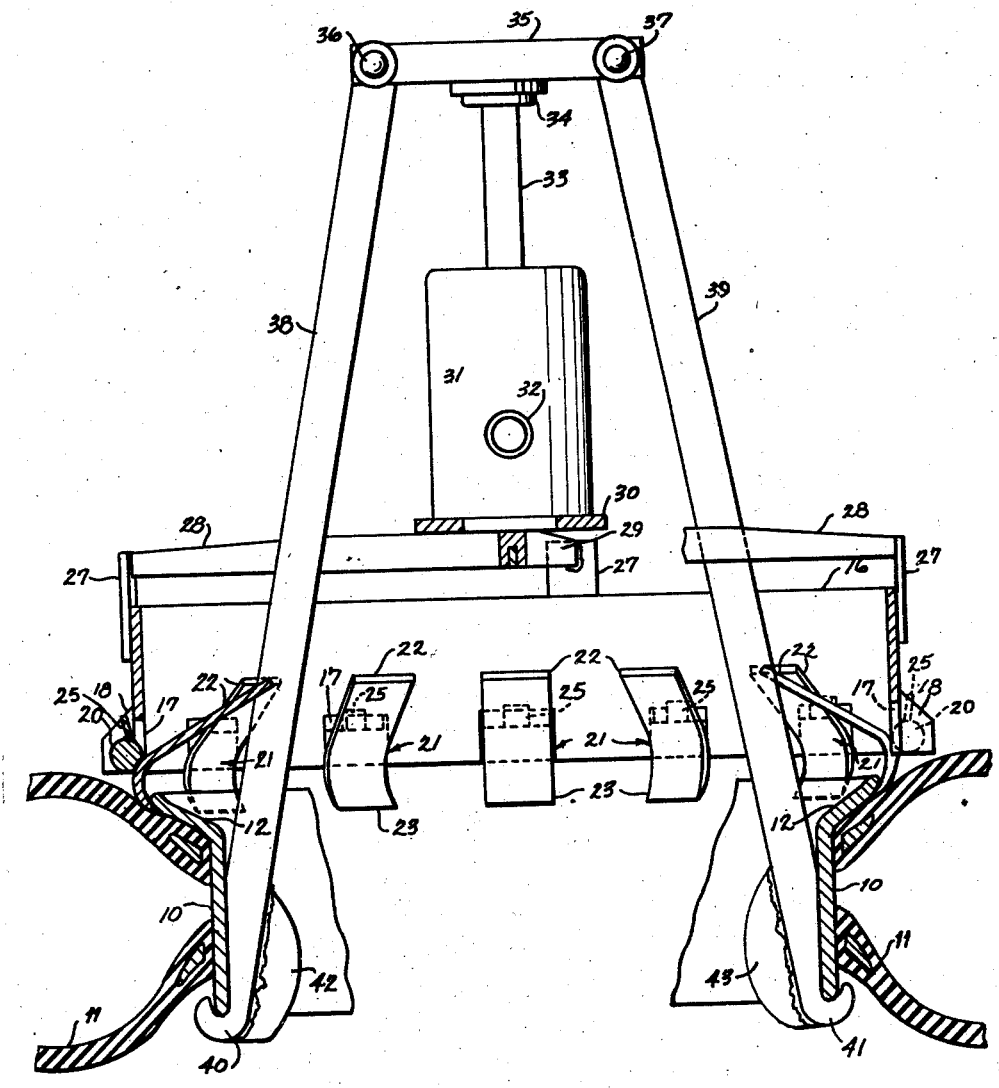
Figure 3 is a vertical sectional view taken through the entire assembled apparatus along line 3—3 in Figure 1.

Referring more specifically to the drawings, the numeral 10 indicates a rim for a pneumatic casing 11, the rim having an upturned flange 12 along one edge thereof, and it can have a similar flange on the other edge thereof, but usually truck tires have a removable flange 14 secured along the other edge of the rim for holding the casing onto the rim during operation thereof.

I have provided a circular ring 16 having a plurality of cut away portions 17 along the lower edge thereof, and projecting from each edge of each cut away portion are pairs of ears 18 and 19 in each pair of which is pivotally mounted a transverse pin 20 and integral with this pin 20 is a dog member 21 having an upwardly and inwardly projecting tail 22 and a pointed lower portion 23 for engaging the casing immediately adjacent the periphery of the flange portion 12 of the rim. Each of the dogs 21 has an upwardly projecting lip 25 which limits downward movement of the tail 22 when the device is not resting on a casing.

The upper portion of the circular member 16 has a plurality of slotted ears 27 in which the ends of cross bars 28 and 29 are fixedly secured such as by welding and the like. These cross bars at the point where they cross each other have welded on the top surfaces thereof a plate 30. This plate 30 is adapted to support a suitable jack such as a hydraulic jack 31 having a socket 32 in its outwardly projecting handle into which a suitable handle member can be inserted for raising the piston therein which is not shown, but having a piston rod 33 projecting upwardly therefrom and being flared outwardly as at 34 at its upper end, which flared out portion 34 is adapted to engage a cross bar 35 which is adapted to rest on the member 34, but not be secured thereto. The outer ends of the cross bar 35 have pivoted thereto as at 36 and 37 downwardly depending dogs 38 and 39.

Figure 4:
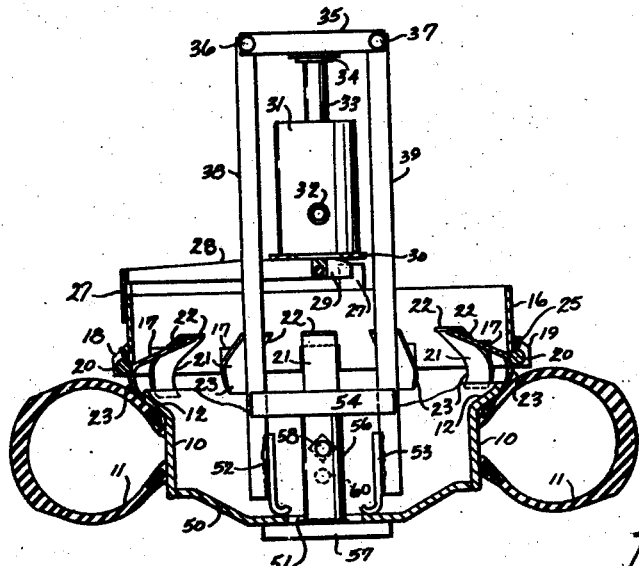
Figure 4 is a vertical sectional view similar to Figure 3, but showing a modified form of anchoring the lower end of the tongs against upward movement.
Figure 5:
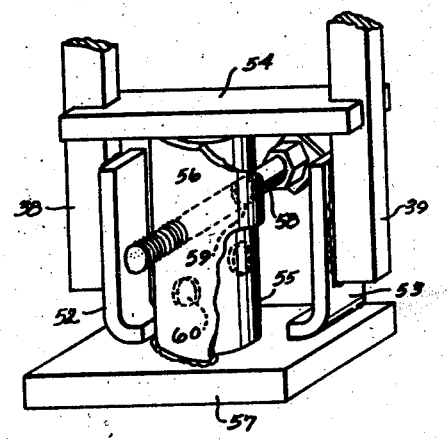
Figure 5 is an isometric view of the lower end of the apparatus which is disposed within the confines of the rim.

Dogs 38 and 39 at their lower ends have hooked portions 40 and 41 thereon and may be reinforced, if desired, by fins 42 and 43. These hooked portions are adapted to engage the lower edge of the rim 10 so as to provide the counter force for holding the dogs 38 and 39 in the position shown while the member 33 is pushed upwardly or the jack body 31 is moved downwardly rather to force the circular member 16 downwardly to remove the upper bead portion of the pneumatic casing away from its associated flange 12 of the rim, In Figures 4 and 5, a slightly modified form of the invention is shown. Like reference characters will apply to like parts, but this type of apparatus as shown in Figures 4 and 5 is adapted to be used with automobile or truck wheels in which a rim alone is not used, but where the rim is integral with the wheel portion. This type of wheel, the rim 12 is integral with wheel 50 and wheel 50 has an opening therein in its center through which the axle may be inserted for securing the wheel to the axle. Instead of having the hooked lower portions 40 and 41 as in Figure 3, the lower end of members 38 and 39 have straps 52 and 53 secured thereto as by welding and the dogs 38 and 39 are slidably mounted in slots in the ends of a cross bar 54 secured on the upper end of an inner pipe 55 which is slidably mounted in an outer pipe 56, the outer pipe 56 being welded at its lower end to a base member 57 which is adapted to rest on the pavement or a suitable floor with the wheel resting on top of the base member 57 as shown in Figure 4. The strap members 52 and 53 prevent upward movement of the members 38 and 39 beyond the point where the upper ends of the strap members 52 and 53 will engage the cross bar 54. The height of the cross bar 54 is adjusted by means of a bolt 58 fitting through coinciding holes 59 or 60 in the inner and outer pipes to adjust the height of cross-piece 54 for different sizes of wheels and tires thereon. In this type of invention, as shown in Figures 4 and 5, the bolt 58 is removed and the cross bar 54 and inner pipe 55 are lifted out of position and the wheel 50 is placed down over the base 57 and then the cross bar 54 and pipe 55 are reinserted in assembled position, and the bolt 58 is inserted in a suitable set of coinciding holes in the pipes 55 and 56 with the members 38 and 39 in the slots in the ends of the cross-bar 54. In this position, when the jack is operated to raise its plunger 33, the lower portion of the jack will be moved downwardly as the plunger 34 cannot move upwardly on account of the members 38 and 39 being anchored against upward movement. This will force the member 16 downwardly, and the pivoted fingers 21 will force the bead of the casing away from its associated rim in the same manner as previously described.

In the drawings and specification, there has been set forth a preferred embodiment of the invention, and although specific terms are employed, they are used in a generic and descriptive sense only, and not for purposes of limitation, the scope of the invention being defined in the claim.

I claim:

A tire tool comprising an annular cylindrical member having a plurality of notches in its lower edge and having an outwardly projecting ear on each side of each notch, an L-shaped dog pivoted intermediate its ends between each pair of said ears and having one end adapted to rest on top of a pneumatic casing mounted on a wheel and lying in prone position and the other end of each of said dogs projecting radially inwardly through the notches in said annular member and adapted to engage the inner wall thereof, thus to limit the pivotal motion of said dogs, means disposed above the annular member and having hooks depending therefrom for engaging the lower side of the wheel, and means between the annular member and the member having hooks thereon for forcing the annular member and the member having hooks thereon away from each other to thereby cause the annular member and its L-shaped dogs to move downwardly to force the upper bead of the casing away from the flange of the rim of the wheel.

GEORGE F. X COLLEY.
his mark

Witnesses to mark:
LEONARD H. BOLLER.
JEFF D. CURRY.